March 2, 1971  O. HANSEN  3,567,513
PROCESS FOR THE MANUFACTURE OF A FREE-FLOWING GLUCOSE PRODUCT
Filed Oct. 14, 1968

INVENTOR
OVE HANSEN

BY

ATTORNEYS

United States Patent Office 3,567,513
Patented Mar. 2, 1971

3,567,513
PROCESS FOR THE MANUFACTURE OF A FREE-FLOWING GLUCOSE PRODUCT
Ove Hansen, Vanlose, Denmark, assignor to Aktieselskabet Niro Atomizer, Soborg, Denmark
Filed Oct. 14, 1968, Ser. No. 767,241
Claims priority, application Denmark, Oct. 17, 1967, 5,137/67
Int. Cl. C13k 1/10
U.S. Cl. 127—62                 5 Claims

ABSTRACT OF THE DISCLOSURE

A process for the manufacture of a glucose product by spray drying. Part of the dried product is mixed with a saturated glucose solution and left standing until a transformation from a gritty to a smooth homogeneous consistency has taken place, then the mixture is recirculated to the spray dryer.

---

Figure 1:
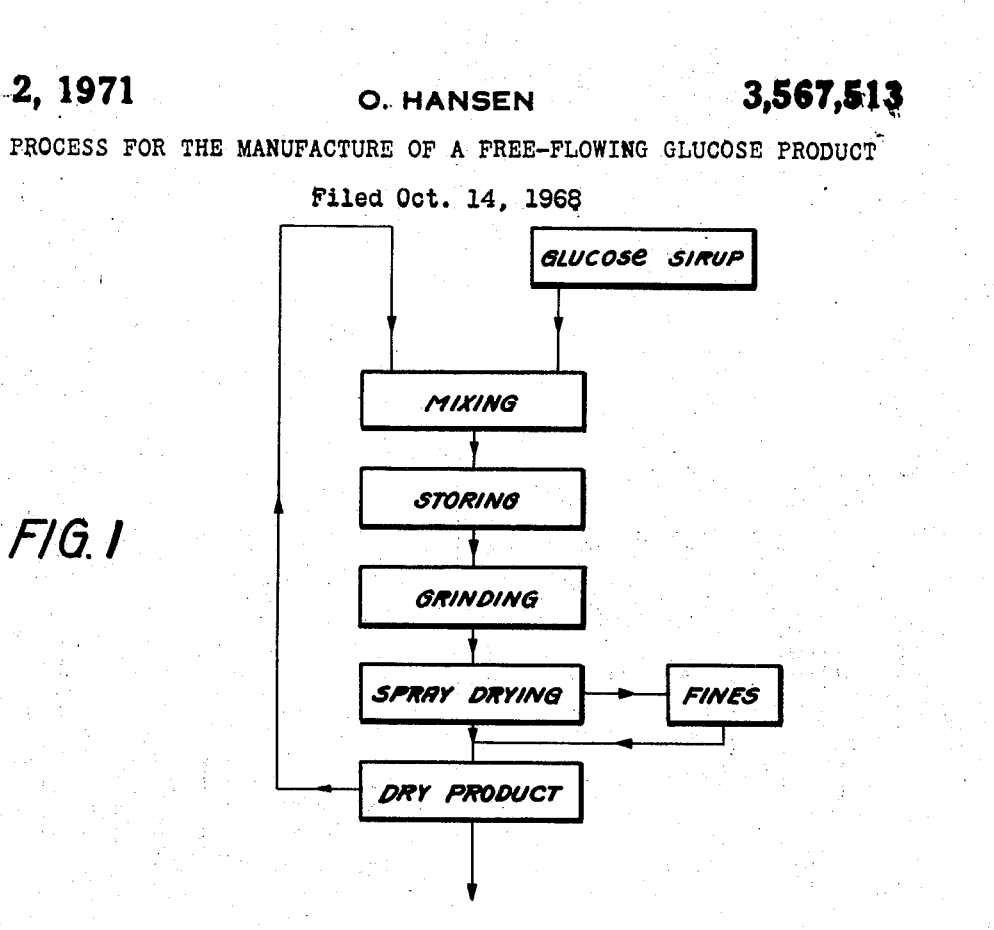

The invention relates to a process for the manufacture of a free-flowing glucose product from a solution thereof, in which the solution is subjected to spray drying and recirculation of a part of the spray-dried product is carried out.

In a known process of the above-stated kind, a part of the spray-dried product is recirculated to the spray drying chamber and is atomized therein simultaneously with the atomization of the solution of the glucose product. The purpose of this recirculation is to obtain a seeding of the oversaturated drops of liquid formed during the atomization and dusting of the particles formed thereby, so that these do not adhere to the sides and bottom of the spray drying chamber. It has, however, been established that this seeding and dusting is not always sufficient to prevent the finished product from, at any event, temporarily adhering to the inside of the chamber.

It has been proposed to seed a glucose solution by introducing the recirculated material into same and thereupon immediately atomizing the mixture formed. This solution has, however, not yielded satisfactory results, in that it necessitated a recirculation of the spray-dried product into the chamber being carried out as well, in order to obtain a free-flowing product.

It has now been established that the recirculation of the spray-dried product into the chamber can be avoided in the process according to the invention, which is characterized in that the recirculated product is mixed with a saturated solution of the glucose product and that the mixture is left standing until a transformation of the recirculated product has taken place, prior to the mixture being spray dried.

The explanation of the favourable effect which the transformation of the recirculated product has on the course of the spray drying is not known with any certainty, but it is presumed that in the suspension formed of recirculated material in the saturated solution, a dynamic equilibrium is produced, during which the crystals of the solid matter dissolve, while at the same time new crystals of another shape and size are formed. It has thus been possible to observe through a microscope, that a marked change of the crystals occurs during the period in which the mixture is being left standing, in that larger and more uniform crystals are formed. The transformation can also be observed macroscopically in that a freshly-prepared suspension of the recirculated product and a saturated solution having a gritty consistency, while the suspension, after having been left standing, gradually acquires a smooth and homogeneous consistency. Moreover, one has been able to note that the ratio between alpha and beta glucoses shifts while standing, in that the development moves towards a reduction in the content of beta glucose and an increase in the content of alpha glucose in the solid phase. It has thus been noted that the ratio between alpha and beta glucoses in a solid glucose product, which originally had a ratio of 59:41, after a period of 24 hours, during which the product was in contact with a saturated glucose syrup having a temperature of approximately 22° C., shifted to 99:1. The fact, that the transformation which takes place during the dynamic equilibrium, results in the formation of a greater quantity of alpha glucose at the expense of the beta glucose, is a natural consequence of the fact that the alpha glucose (or alpha glucose monohydrate) is the stable, solid form at temperatures of up to approximately 113° C.

It is, furthermore, presumed that the transformed product contains crystals of a shape and size particularly suited as a base for crystallization of the dry matter in the oversaturated drops formed by the spray drying and that this is the reason for a faster and more complete crystallization being obtained, which results in the formation of a free-flowing product.

The hypothesis to the effect that the crystal structure of the solid matter in the mixture that is to be spray dried has a considerable bearing on the process of crystallization, is substantiated by the fact that the end product becomes sticky, when a commercial form of pure alpha glucose is added to the solution, which consists substantially of very large crystals.

According to the invention, the mixture of the recirculated product and the solution are left standing for a period of up to 24 hours, during which period such a sufficiently great transformation takes place, that spray drying becomes possible. By being left standing for a still longer period, an increase of the large crystals takes place at the expense of the small ones and as a consequence thereof the suspension again loses its feasability of being directly spray dried.

During the spray drying there likewise occurs a shift in the ratio between alpha and beta glucoses, which also is presumed to be a result of the fact that the temperature of the product during this treatment lies below 113° C., which, as mentioned, is the lowest temperature at which beta glucose is stable. If the added, recirculated product is used in a quantity that is equal to the glucose content in the syrup, and it is presumed that the transformation into alpha glucose has been complete, this implies that the ratio between alpha and beta glucoses in the bulk end product is at least 3:1.

If the recirculated quantity is not sufficiently large in relation to the quantity of dry matter in the solution, a sticky product is obtained after the drying. It has been established in practice, that in order to obtain a satisfactory drying, the recirculated product must be mixed with a quantity being at least equal to one fifth of the dry matter content in the solution.

According to the invention, the recirculated quantity of glucose product should not be larger than the dry matter content in the solution, for by employing larger quantities such a viscous mixture is formed, that same is difficult to atomize.

In order to obtain the biggest possible production, the recirculated quantity should, however, come as closely to the upper limit as possible. It has been established, that a satisfactory production is obtained when the recirculated quantity is equal to 0.8 to 1.0 times the quantity of dry matter in the solution.

In order to promote the process of crystallization during the spray drying, it has proved itself expedient for the mixture, after having been left standing, but prior to the spray drying, being subjected to grinding. Hereby is achieved that the crystal size of the product manufactured is kept very small, so that the product is particularly suited for recirculation. The grinding can, for instance, be carried out in a ball mill or a colloidal mill.

The invention will be described below in greater detail, while referring to the following example.

In a mixing apparatus glucose syrup having a dry matter content of 50% is mixed with so-called total sugar in a proportion of 300 kg. syrup per 150 kg. total sugar dry matter. The mixture is left standing (while being stirred) in a tank for 15 hours at a temperature of 15–20° C. Thereafter the mixture is spray dried, while hot air having a temperature of 130–180° C. is introduced at a rate of 1500 kg. per hour. The outlet temperature of the air was around 50–55° C. A powder was formed, which initially adhered to the drying chamber, but which after some time fell out evenly therefrom. The powder had a discharge temperature of 40° C. The ratio between the alpha and beta glucoses in the end product was 93:7. The product was a free-flowing powder having a water content of approximately 12–15%.

Figure 2:
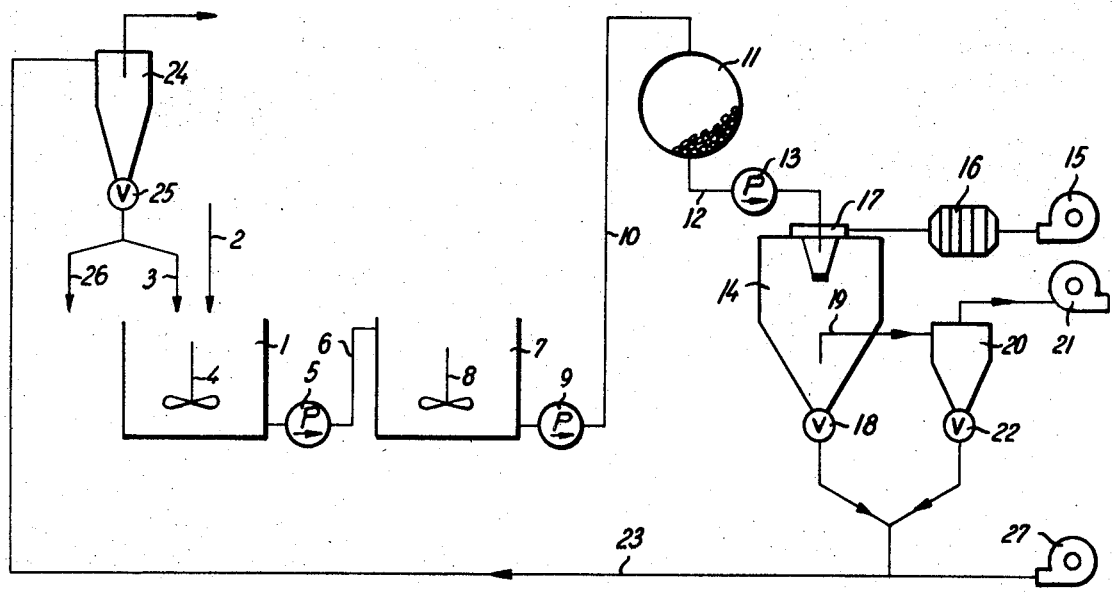

In the following the invention is described with reference to the drawing in which FIG. 1 represents a flowsheet of the process and FIG. 2 a schematical diagram of a plant for carrying out the process according to the invention.

The drawing shows a mixing tank 1 for glucose syrup which is fed through line 2, and recirculated dry product coming through line 3. The suspension formed in the tank is kept in motion by the stirrer 4. From tank 1 the suspension is pumped by means of the pump 5 through the line 6 to the storage tank 7, which is also equipped with a stirrer 8. From the storage tank the suspension is pumped by means of the pump 9 through the line 10 to a ball mill 11. The ground suspension leaves the mill through line 12 and is fed by the pump 13 into the spray dryer 14 in which it is centrifugally atomized into hot air coming from the blower 15 and heater 16 through the air disperser 17. The dried product leaves the spray dryer through the powder valve 18 and the drying air together with the fine particles of dry product is taken out through the line 19 to cyclone 20 which separates the fine particles from the air. The air is sucked out by the ventilator 21 and the fine particles fraction leaves the cyclone through the powder valve 22. The combined chamber powder fraction and cyclone powder fraction are by means of a blower 27 transported pneumatically through the line 23 to the cyclone 24. The dry product which leaves the cyclone through the powder valve 25 is divided into two fractions, one being recirculated to the process through the line 3 and the other one being the final product produced leaving through the line 26.

What is claimed is:

1. Process for the manufacture of a free-flowing glucose product from a solution thereof, whereby the solution is subjected to spray drying and recirculation of a part of the spray-dried product is carried out, characterized in that the recirculated product is mixed with a saturated solution of the glucose product and that a mixture is left standing until a transformation of the recirculated product has taken place as evidenced by a change from a gritty consistency of the original suspension to a smooth homogeneous consistency, prior to the mixture being spray-dried.

2. Process as claimed in claim 1, characterized in that the mixture is left standing for a period of up to 24 hours.

3. Process as claimed in claim 1, characterized in that the recirculated product is mixed with a quantity being at least equal to one fifth of the dry matter content in the solution.

4. Process as claimed in claim 1, characterized in that the recirculated product is mixed with a quantity being at the most equal to preferably 0.8–1.0 times the dry matter content in the solution.

5. Process as claimed in claim 1, characterized in that the solution, after having been left standing, but prior to the spray drying, is subjected to grinding.

References Cited
UNITED STATES PATENTS 3,477,874   11/1969   Repsdorph _____ 127—61X MORRIS O. WOLK, Primary Examiner S. MARANTZ, Assistant Examiner U.S. Cl. X.R.

99—199